(12) United States Patent
Doering et al.

(10) Patent No.: US 9,227,619 B2
(45) Date of Patent: Jan. 5, 2016

(54) SYSTEM AND METHOD FOR IMPROVED VEHICLE RESPONSE DURING VEHICLE ACCELERATION CONDITIONS

(71) Applicant: Ford Global Technologies, LLC, Dearborn, MI (US)

(72) Inventors: Jeff Doering, Canton, MI (US); Bradley D Riedle, Northville, MI (US); Rob Ciarrocchi, Stockbridge, MI (US); Scott Redmon, Pinckney, MI (US); Hank Kwong, Farmington Hills, MI (US); William Eckenrode, Willis, MI (US); Frederick Page, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 14/109,151

(22) Filed: Dec. 17, 2013

(65) Prior Publication Data

US 2014/0106934 A1    Apr. 17, 2014

Related U.S. Application Data

(62) Division of application No. 12/909,515, filed on Oct. 21, 2010, now Pat. No. 8,635,001, which is a division of application No. 11/370,400, filed on Mar. 7, 2006, now Pat. No. 7,917,275.

(51) Int. Cl.
| | | |
|---|---|---|
| *G06F 7/00* | (2006.01) |
| *G06F 19/00* | (2011.01) |
| *G06F 17/00* | (2006.01) |
| *B60W 10/06* | (2006.01) |
| *F02D 41/00* | (2006.01) |
| *F02D 41/02* | (2006.01) |
| *F02P 5/15* | (2006.01) |
| *B60W 10/11* | (2012.01) |
| *F02D 41/18* | (2006.01) |
| *F02D 11/10* | (2006.01) |

(52) U.S. Cl.
CPC ............... *B60W 10/06* (2013.01); *B60W 10/11* (2013.01); *F02D 41/0002* (2013.01); *F02D 41/0215* (2013.01); *F02P 5/1504* (2013.01); *F02D 41/187* (2013.01); *F02D 2011/102* (2013.01); *F02D 2200/0404* (2013.01); *F02D 2200/1004* (2013.01); *F02D 2250/18* (2013.01); *F02D 2400/12* (2013.01); *Y02T 10/42* (2013.01); *Y02T 10/46* (2013.01); *Y10T 477/6333* (2015.01); *Y10T 477/677* (2015.01)

(58) Field of Classification Search
None
See application file for complete search history.

(56) References Cited

U.S. PATENT DOCUMENTS

| | | |
|---|---|---|
| 3,898,894 A | 8/1975 | Aono et al. |
| 4,376,428 A | 3/1983 | Hata et al. |
| 5,626,536 A | 5/1997 | Kono et al. |
| 6,199,004 B1 | 3/2001 | Russell et al. |
| 6,217,481 B1 | 4/2001 | Watanabe et al. |
| 6,266,597 B1 * | 7/2001 | Russell et al. ............ 701/54 |
| 6,430,492 B2 | 8/2002 | Kotwicki et al. |
| 6,468,183 B1 | 10/2002 | O'Neil et al. |

(Continued)

*Primary Examiner* — Bhavesh V Amin
(74) *Attorney, Agent, or Firm* — Julia Voutyras; Alleman Hall McCoy Russell & Tuttle LLP

(57) ABSTRACT

A vehicle control method for a vehicle having an internal combustion engine coupled to a torque converter is described. In one embodiment, the engine air flow and spark are adjusted to control torque converter operation. The method can improve vehicle response to driver accelerator commands.

5 Claims, 7 Drawing Sheets

(56) References Cited

U.S. PATENT DOCUMENTS

| | | |
|---|---|---|
| 6,506,140 B1 | 1/2003 | O'Neil et al. |
| 6,516,778 B1 * | 2/2003 | Light et al. .................... 123/352 |
| 6,543,414 B2 * | 4/2003 | O'Neil et al. ................. 123/350 |
| 6,560,523 B2 | 5/2003 | Kotwicki et al. |
| 6,600,988 B1 | 7/2003 | Da et al. |
| 6,754,573 B2 | 6/2004 | Russell et al. |
| 6,910,990 B2 * | 6/2005 | Doering et al. ............... 477/110 |
| 6,945,910 B1 | 9/2005 | Cullen et al. |
| 7,249,583 B2 | 7/2007 | Bidner et al. |
| 7,676,315 B2 | 3/2010 | Doering et al. |
| 7,917,275 B2 | 3/2011 | Doering et al. |
| 2003/0203790 A1 | 10/2003 | Matsubara et al. |
| 2005/0054482 A1 * | 3/2005 | Doering et al. ............... 477/107 |
| 2009/0275440 A1 | 11/2009 | Doering et al. |

* cited by examiner

SYSTEM AND METHOD FOR IMPROVED VEHICLE RESPONSE DURING VEHICLE ACCELERATION CONDITIONS

CROSS REFERENCE TO RELATED APPLICATIONS

The present application is a divisional of U.S. patent application No. 12/909,515, entitled "SYSTEM AND METHOD FOR IMPROVED VEHICLE RESPONSE DURING VEHICLE ACCELERATION CONDITIONS," filed on Oct. 21,2010, which is a divisional of U.S. patent application No. 11/370,400, entitled "SYSTEM AND METHOD FOR IMPROVED VEHICLE RESPONSE DURING VEHICLE ACCELERATION CONDITIONS," filed on Mar. 7, 2006, now U.S. Pat. No. 7,917,215, the entire contents of each of which are hereby incorporated by reference for all purposes.

FIELD

The present application relates to engine and vehicle control, and in one example relates to operation during vehicle acceleration following deceleration.

BACKGROUND AND SUMMARY

Internal combustion engines are controlled in many different ways to provide acceptable driving comfort during all operating conditions. Some methods use engine output, or torque, control where the actual engine torque is controlled to a desired engine torque through an output adjusting device, such as with an electronic throttle, ignition timing, or various other devices.

Under some conditions, there is the potential for poor driveability when the vehicle operator releases and subsequently engages the accelerator pedal. Specifically, as described in U.S. Pat. No. 6,266,597, transmission or driveline gear lash crossing during such conditions can degrade driver feel. For example, when the engine transitions from exerting a positive torque to exerting a negative torque (or being driven), the gears in the transmission or driveline separate at the zero torque transition point. Then, after passing through the zero torque point, the gears again make contact to transfer torque. This series of events produces an impact, which if transmitted to the driver is called clunk, resulting in poor driveability and customer dissatisfaction.

This disadvantage of the prior art is exacerbated when the operator returns the accelerator pedal to a depressed position, indicating a desire for increased engine torque. In this situation, the zero torque transition point must again be traversed. However, in this situation, the engine is producing a larger amount of torque than during deceleration because the driver is requesting acceleration. Thus, another, more severe, impact is generally experienced due to the transmission or driveline lash during the zero torque transition.

As such, in U.S. Pat. No. 6,910,990, the system controls engine torque to transition through the transmission or driveline lash zone by limiting a rate of torque increase during such conditions. In other words, when near the transmission lash zone, engine torque is adjusted at a predetermined rate until the system passes through the transmission lash zone. Further, the limiting may be adjustable based on operating conditions. By varying the limitation on the torque change in this way, driveability can be improved.

However, the inventors herein have recognized a disadvantage with such an approach. In particular, while rate limiting torque changes may reduce clunk, it may also increase a response delay to the point noticeable by the driver. Further, the greater the reduction in clunk (i.e., the more torque increases or decreases are limited), the greater the response delay.

The above disadvantages may be overcome by a vehicle control method for a vehicle having an internal combustion engine coupled to a transmission, the transmission coupled to wheels on a road. This transmission may be an automatic transmission with a torque converter with a torque converter bypass clutch, the torque converter having an input speed and an output speed, the torque converter coupled to a gearbox. This automatic transmission converter bypass clutch may be at minimal capacity ("open converter"), being modulated to maintain a targeted level of clutch slip or capacity or it may be at full capacity ("hard locked"). The method comprising of in response to a driver tip-out during at least some conditions, decreasing powertrain output so that positive torque is not transmitted to the wheels, and after said tip-out and in response to a driver tip-in, and at least during transitioning to transmission of positive powertrain torque to the wheels, retarding ignition timing while adjusting engine airflow until driveline torque has transitioned to the positive side of lash, and then advancing spark angle to rapidly provide output torque.

In this way, it may be possible to coordinate multiple torque actuators during a driver tip-in to both reduce clunk without substantially increasing total response time. For example, by coordinating throttle and ignition timing adjustments during a driver tip-in in this way, it is possible to, in effect, increase pre-charging of the intake manifold and cylinders with airflow so that once the transition through the lash zone is complete, a more rapid torque increase is possible.

DETAILED DESCRIPTION

Figure 1:
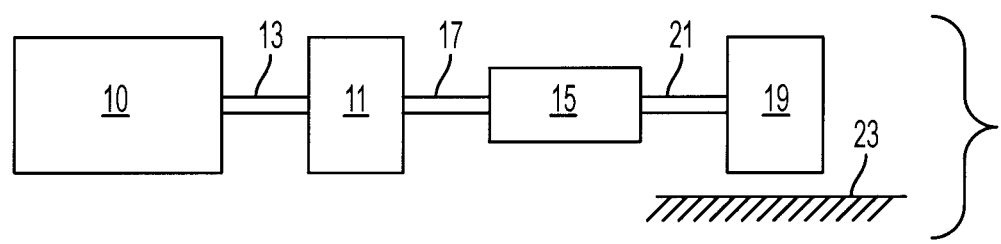
FIG. 1 is a block diagram of a vehicle illustrating various powertrain components.
Figure 2:
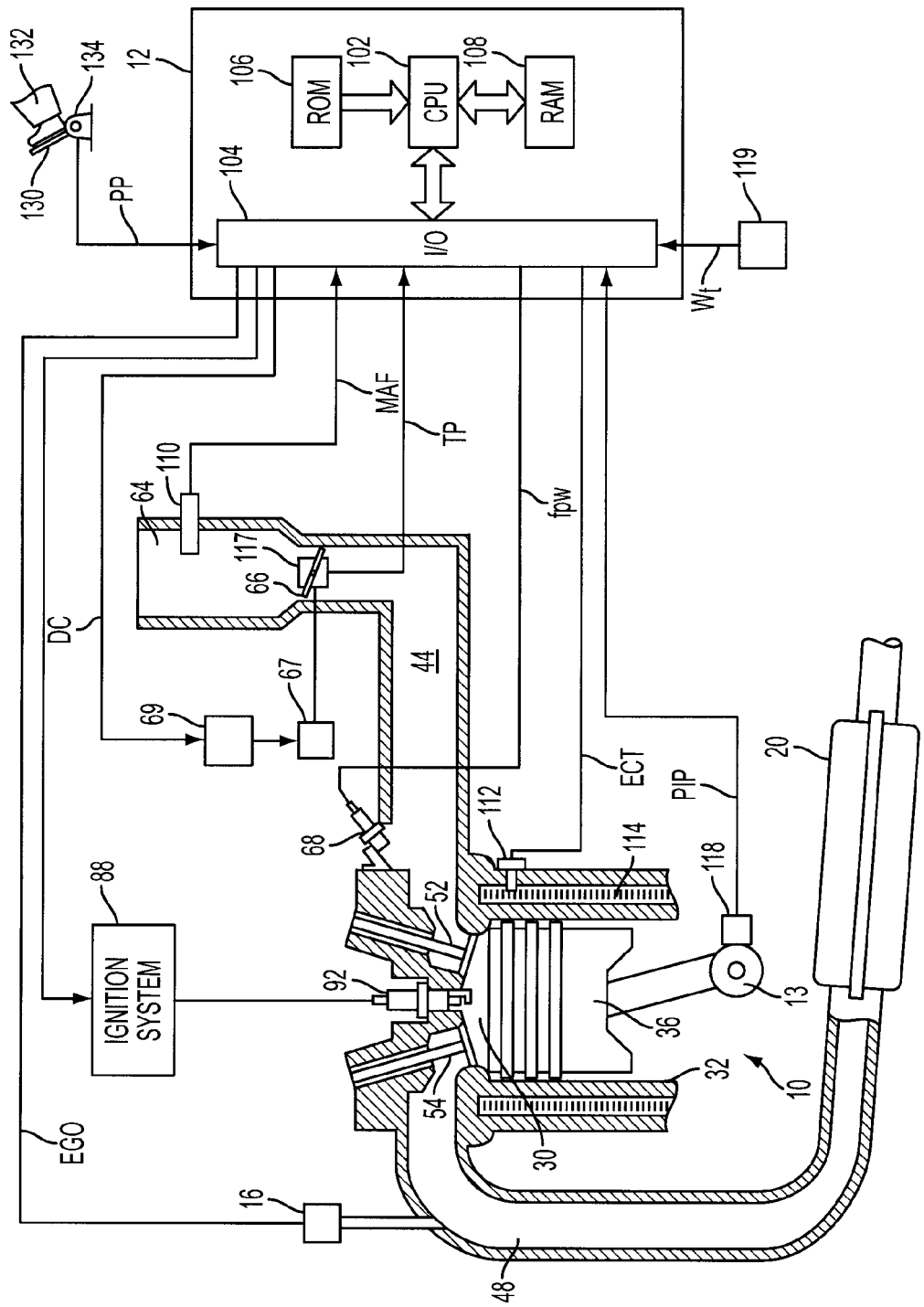
FIG. 2 is a block diagram of an engine.

Referring to FIG. 1, internal combustion engine 10, further described herein with particular reference to FIG. 2, is shown coupled to torque converter 11 via crankshaft 13. Torque converter 11 is also coupled to transmission 15 via turbine shaft 17. Torque converter 11 has a bypass clutch (not shown) which can be engaged, disengaged, or partially engaged. When the clutch is either disengaged or being disengaged, the torque converter is said to be in an unlocked state. Turbine shaft 17 is also known as transmission input shaft. In one embodiment, transmission 15 comprises an electronically controlled transmission with a plurality of selectable discrete gear ratios. Transmission 15 may also comprises various other gears, such as, for example, a final drive ratio (not shown). Alternatively, transmission 15 may be a continuously variable transmission (CVT).

Transmission 15 may further be coupled to tire 19 via axle 21. Tire 19 interfaces the vehicle (not shown) to the road 23.

Note that in one example embodiment, this powertrain is coupled in a passenger vehicle that travels on the road.

Internal combustion engine 10 comprising a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (N). Alternatively, turbine speed may be determined from vehicle speed and gear ratio.

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

As described above, the present application is directed, in one example, to solving disadvantages that occur when the driver "tips-in" (applies the accelerator pedal) after the torque in the driveline has transitioned into the negative region. In such cases, the driveline elements will have to transition through their lash region to provide positive torque to the wheels, where the transition through the lash region can produce an objectionable "clunk" if the impact velocity of the driveline elements is too fast.

In an automatic transmission vehicle, to have positive torque produced by the torque converter and transmitted to the driveline, the engine speed must be above turbine speed and the turbine speed must be at the synchronous turbine speed or the converter bypass clutch must have some capacity to transmit torque and the engine torque is positive and the slip across the clutch is non-negative. (The torque converter slip (engine speed−turbine speed) is greater than 0 when positive torque is being delivered). If the transition from negative to positive converter slip and/or torque is not properly managed, then the engine can accelerate too fast through this region (beginning to produce positive torque) or the converter clutch torque can rise too fast resulting in a higher rise rate of output shaft torque accelerating the elements in the driveline. Higher torque levels before the lash in the driveline being taken up can then produce higher impact velocities and make "clunk" more likely. To a first approximation for an "open" converter, the rise rate of torque in the driveline (non-shifting) may be proportional to the rate of engine acceleration when the engine speed>synchronous turbine speed.

Under some conditions, the engine should be controlled so that the engine torque and/or acceleration is reduced sufficiently while the driveline elements are accelerating to produce positive driveline torque, but the engine torque/acceleration and driveline torque should also be responsive to the driver's demand before and after this transition so that the driver perception of any lag in the engine response is reduced.

While an engine torque estimation model in the controller can be used, errors in the estimation can reduce estimate accuracy and thus the precision to indicate whether the driveline torque is slightly positive or slightly negative. As such, in one embodiment that can be used alone or in addition to a torque estimate, additional measurements, such as torque converter input and output speeds can be used to accurately indicate when the vehicle is beginning and ending transitioning through the lash region, even in the presence of external noise factors.

Specifically, in one example for a torque converter equipped vehicle, a tip-in management and control routine can be used to adjust engine torque control to control engine acceleration just as the engine speed is exceeding turbine speed. Further, the engine torque may be controlled via multiple actuators, such as using slower throttle control and faster ignition timing control in a coordinated way to minimize any driver perception of rate limited torque during the transition through the lash region. For example, various example engine control strategies using coordinated throttle and spark control to manage the transition from negative driveline torque to positive driveline torque through driveline lash with improved robustness and responsiveness is described below with regard to FIGS. 3-7. Because of the coordinated use of throttle and spark and the triggering of control system actions based on measured speeds across a torque converter, the operation of this system can provide various advantages as noted herein.

Figure 3:
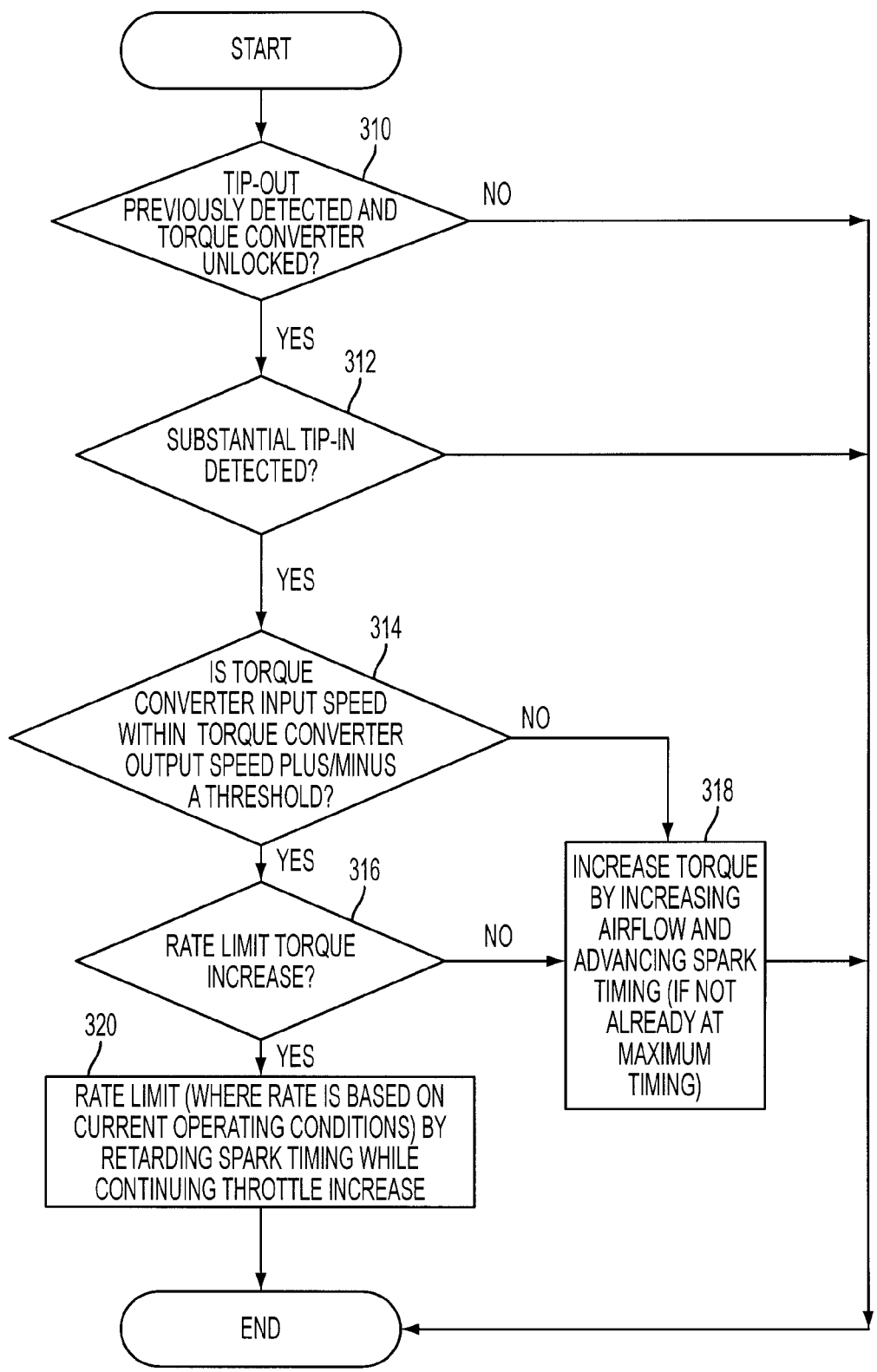
FIG. 3 is a high level flowchart of a routine for controlling the engine and powertrain.

Referring now to FIG. 3, a routine is described for controlling engine and vehicle operation during a driver tip-in where the transition through a gear lash zone for an open converter configuration is managed while still providing acceptable increasing torque response. In 310, the routine determines whether a previous driver tip-out has been detected and the torque converter is unlocked, or partially un-locked. In one example, the routine determines whether the driver is depressing the accelerator pedal by determining whether the pedal position is less than the preselected value. Note that this preselected value can be an adaptive parameter that tracks variations in the closed pedal position due to sensor aging, mechanical wear, and various other factors. Also note that in response to a driver tip-out being detected, powertrain output may be decreased so that positive torque is not transmitted to the wheels, for example, the wheels may be driving the engine through the transmission and/or torque converter. Further, during some tip-out conditions, fuel injectors may be deactivated to further reduce engine torque (or increase engine braking), possibly improving fuel economy. However, may be considered in some examples when transitioning through the lash zone, for example.

When the answer to 310 is YES, the routine continues to 312. In 312, the routine determines whether a substantial driver tip-in has been detected. Again, this may be determined based on pedal position, or the corresponding increase in desired torque caused by depression of the driver pedal, for example. If so, the routine continues to 316.

In 314, the routines whether the powertrain is in or near a gear lash zone. For example, the routine may utilize the torque converter input and output speeds to determined whether the speeds are within a selected range of equal speeds, for example, and whether the speeds are greater than a synchronous speed, for example. If not, the routine continues to 318 where a requested torque increase may be provided by a throttle increase and an advance of ignition timing (if the current timing is retarded from a maximum torque timing, for example).

Otherwise, if the answer is YES to 314, the routine continues to 316 to determine whether torque increase rate limiting is selected based on operating conditions. For example, the routine may determine whether to limit a rate of torque increase during the lash zone to reduce a potential impact caused by such lash as noted herein. If so, the routine continues to 320 to limit torque increase by retarding ignition timing while still increasing airflow by increasing the throttle angle, for example. In this way, it is possible to limit torque increase during transitions through the lash zone via spark retard, yet by continuing an increase in airflow without the limitation such as in prior approaches, the torque can be even more rapidly increases once through the lash zone. Such operation is illustrated in more detail in the prophetic example of FIG. 4.

Figure 4:
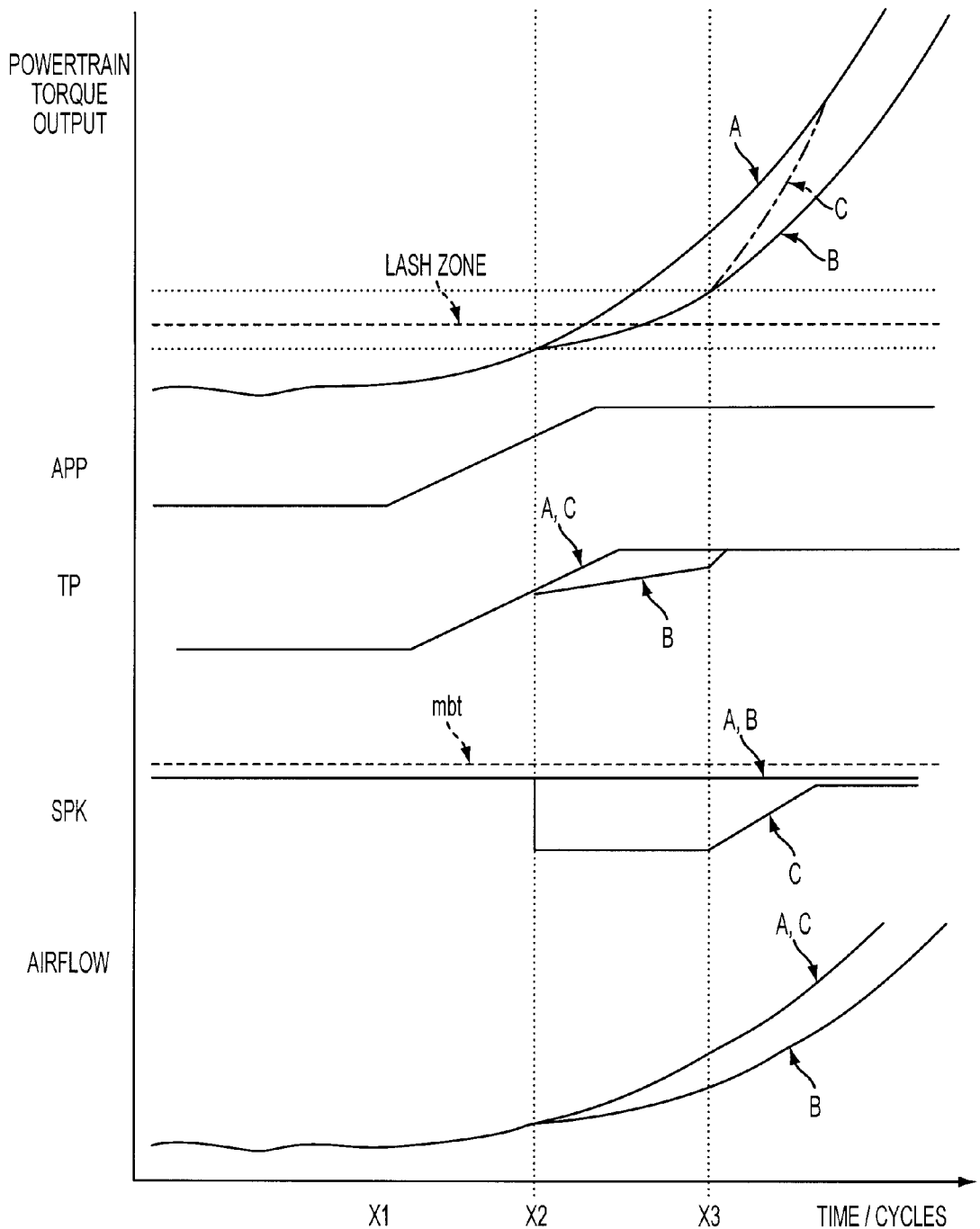
FIG. 4 is a graph illustrating example operation.

Specifically, FIG. 4 shows an example response to a driver tip-in where the powertrain output torque transitions from negative to positive, as shown by the top graph. The lash zone, or approximately zero torque transmission location is illustrated with the dashed horizontal line, where the lower dotted line indicates an example speed ratio threshold (e.g., torque converter input speed is 0.95 of torque converter output speed) and the upper dotted line indicates an example speed ratio threshold (e.g., torque converter input speed is 1.05 of torque converter output speed). Below the powertrain output torque the graph illustrates driver pedal position (APP) and then throttle position (TP) of an electronically controlled throttle plate. Below throttle position the graph illustrates ignition timing, and specifically timing relative to a maximum torque timing (mbt), where spark timing below the mbt line represents retard from mbt. Finally, the bottom illustration shows the airflow response.

FIG. 4 shows three example response, with the first (A) illustrating a tip-in with no mitigation in ignition timing or airflow, and thus the most likely to cause objectionable clunk; the second (B) illustrating a tip-in with a limitation of engine torque via the throttle, or airflow, which may be used to reduce the effect of clunk; and the third (C) illustrating compensation via coordination of throttle and spark in accordance with FIG. 3.

In the first response (A), neither engine torque, nor throttle, nor spark, are used to rate-limit the powertrain output during the transition through the lash zone. Thus, clunk may be experienced under some conditions, however a quick response is experience by the driver.

In the second response (B), throttle position is used to rate limit torque increase during the transition. Once through the lash zone, the throttle can then continue to increase unrestricted to deliver the driver requested torque. However, while the limiting may reduce clunk, driver response may be reduced by the delay in delivering airflow, due to the combination of manifold dynamics, throttle dynamics, and the rate limiting. In other words, as shown by Figure, the torque response in B is permanently delayed from A.

In the third response (C), coordination of throttle position and spark retard are used to transition through the lash zone, while still providing acceptable response. As shown by FIG. 4, while there is a period of delay in response when transitioning through the lash zone, the torque response of C is able to "catch up" to the torque response of A. By using spark retard during the transition, while allowing airflow to continue to rise substantially un-restricted, it is possible to both reduce clunk, and maintain driver performance over a longer scale.

Returning to 320, the level to which engine torque can be managed or reduced relative to requested output may be dependent on operating conditions, in one embodiment. For example, an allowable rate of increase in engine torque may be based on various factors, such as based on information that relates to status and conditions of the engine and vehicle indicative of whether and to what extent clunk can affect drive feel, and the extent rate limiting requested engine torque may reduce vehicle response. In particular, in one example, the routine utilizes the sensed accelerator pedal position (PP), the torque converter speed ratio, the vehicle speed, and the ratio of vehicle speed to engine speed. In one example, the allowable rate of increase may be determined as a four dimensional function of the pedal position, speed ratio, vehicle speed, and engine speed to vehicle speed ratio.

Concluding the discussion of FIG. 3, if the answer to 314 or 316 is no, the routine continues to 318 in this example.

Figure 5:
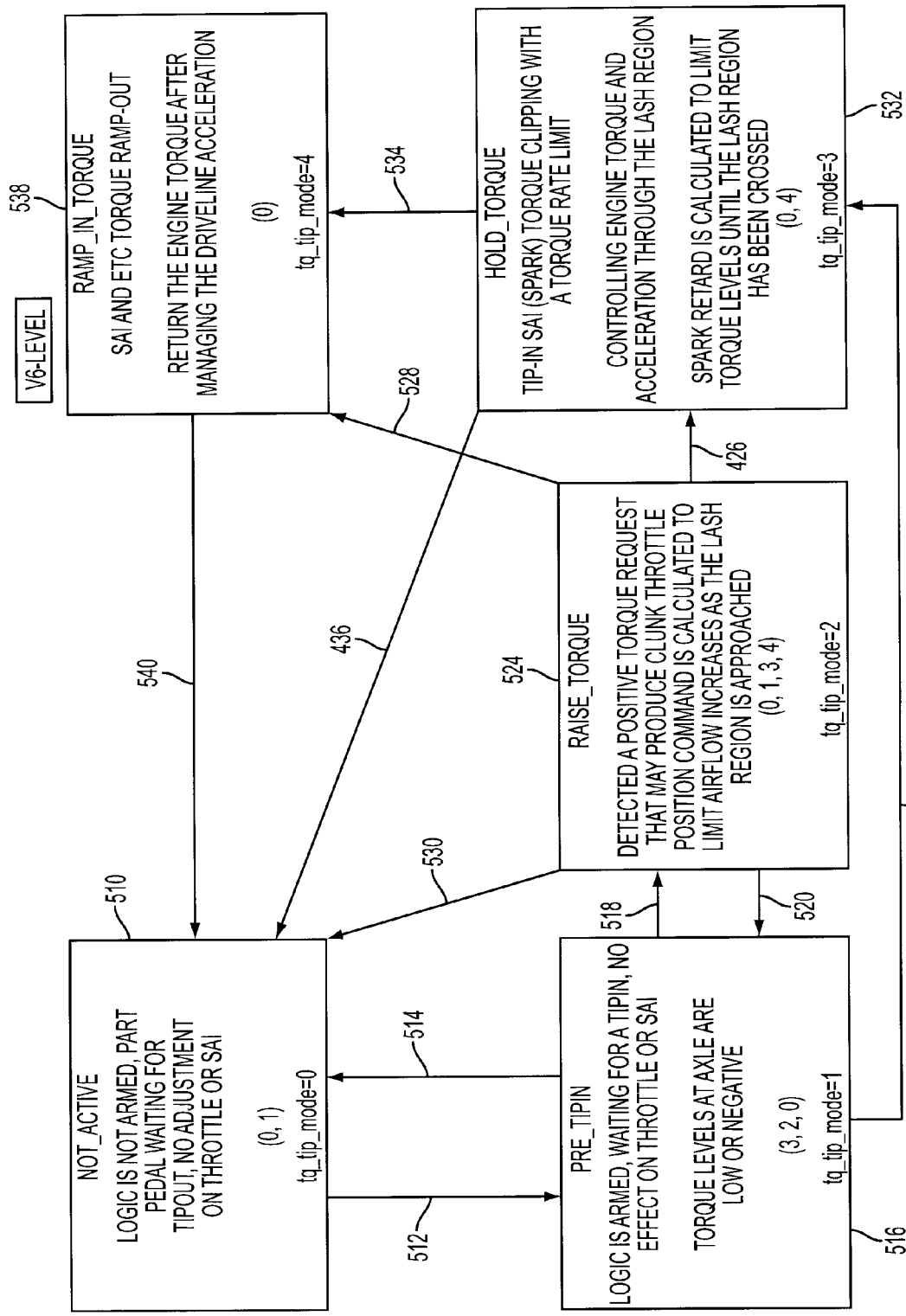
FIG. 5 is a state diagram of example control logic and routines.

Referring now to FIG. 5, an alternative embodiment illustrated via a state diagram is shown. Specifically, each block shows a control logic state, with transitions amount the states shown by lines, where the direction of the transition is indicated with an arrow. Further the blocks indicate their state value (e.g., block 510 is STATE 0, as indicated by the mode parameter tq_tim_mode). Further, each block indicates potential states to which the control may transition via the numbers in parenthesis.

Block 510 shows STATE 0, in which control logic for making engine adjustments for transitioning through the lash zone in response to a tip-in are not activated. Specifically, the logic is disarmed, and the system is at part pedal (e.g., the driver is partly tipped in) waiting for a tip-out. Further, there is currently no adjustment to engine throttle angle or ignition timing (SAI). As indicated in the parenthesis, from block 410, the control may transition to either STATE 1, or stay in STATE 0.

512 shows a transition from STATE 0 to STATE 1, which may be based on several alternative conditions. A first transition condition is based on torque converter slip, in either an overrunning or non-overrunning condition. Specifically, if negative slip and a low torque request (i.e., less than a threshold value TQ_ARM) are detected, the state transitions. A second transition condition is independent of slip, but rather based on a low actual torque (i.e., less than a threshold value TQ_ARM) being detected.

514 shows a transition from STATE 1 to STATE 0, which may occur based on slip for either an overrunning or non-overrunning condition in which the routine identifies whether the powertrain has reached a positive slip value (e.g., torque converter input speed greater than torque converter output speed, or whether the transmission is in neutral or disabled. Alternatively, the transition may occur independent of slip based on whether the powertrain has reached a positive actual torque (i.e., greater than a threshold value TQ_DISARM).

Block 516 shows STATE 1, in which control logic prepares for a tip-in. In this case, the control logic for making adjustments during a transition to a driver tip-in through the lash zone is armed, and the routine is waiting for a tip-in to occur. Further, there is currently no additional lash-based adjustment to engine throttle angle or ignition timing (SAI) in this state. As indicated in the parenthesis, from block 516, the control may transition to either STATES 3, 2, or 0. While in STATE 1, the vehicle powertrain torque levels at the driver axle are low or negative, depending on operating conditions.

518 shows a transition from STATE 1 to STATE 2 based on whether a significant positive torque request (i.e., desired torque increases past a threshold level) is detected. Further, 520 shows a transition from STATE 1 to STATE 0 based on whether a torque request has dropped (i.e., below a lower threshold) and is below a torque control level. 522 shows a transition from STATE 1 to STATE 3 which may be based on slip in either an overrunning or non-overrunning condition, such as based on whether the torque converter speed ratios have entered a range of lash values, such as between 0.95 and 1.05. In this case, the system can be determined to have begun a transition through lash region based on slip. Alternatively, the transition may be independent of slip, such as based on whether actual torque becomes greater than a threshold.

Block 524 shows STATE 2, in which control logic increases engine torque. In this case, the control logic detects a positive torque request that may produce clunk, and calculates a limited airflow increase as the lash region is approached. Specifically, a throttle position of the electronically controlled throttle is clipped. As indicated in the parenthesis, from block 524, the control may transition to either STATES 4, 3, 1, or 0.

526 shows a transition from STATE 2 to STATE 3 which may be non-slip based via a exceeding a timer. Alternatively, the transition may be slip based in either an overrunning or non-overrunning condition based on whether the powertrain has begun to transition through lash region based on torque converter speeds, e.g., has the ratio of torque converter input speed to torque converter output speed risen above a threshold value (e.g., 0.95). Still further, the transition can be non-slip based, such as whether the powertrain has begun to transition through the lash region based on actual engine torque.

528 shows a transition from STATE 2 to STATE 4 which may be based on torque converter slip values and a timer value (e.g., exceeding a threshold time in STATE 2). Further, 530 shows a transition from STATE 2 to STATE 4 which also may be based on torque converter slip values and a timer value (e.g., exceeding a threshold time in STATE 2).

Block 532 shows STATE 3, in which control logic holds or rate-limits engine and/or powertrain torque. In this case, the control logic adjusts spark timing (e.g., ignition timing retard from maximum torque timing) and optionally throttle position to clip engine torque and/or acceleration using a torque rate limit to reduce clunk through the lash zone. As indicated in the parenthesis, from block 532, the control may transition to either STATES 4, or 0. For a torque converter where the converter clutch capacity is small enough to allow enough slip such that engine acceleration is clearly related to engine torque and converter hydraulic torque as the dominant dynamics (instead of converter clutch torque), this clipping, holding or rate-limiting of can be conditional based on engine acceleration or slip feedback.

534 shows a transition from STATE 3 to STATE 4, which may be based on slip in either an overrunning or non-overrunning condition, such as based on whether the torque converter speed ratios have exited a range of lash values, such as between 0.95 and 1.05 (i.e., whether the powertrain has completed a transition through the lash region based on torque converter speeds, e.g., has the ratio of torque converter input speed to torque converter output speed risen above a threshold value, such as 1.05). The transition may also be triggered independent of slip, and the determination of completing the transition may be based on whether actual torque is greater than a threshold value. Still further, the transition may be triggered by whether a downshift of the transmission gears in progress, or whether a timer value has been exceed for a threshold time in STATE 3.

536 shows a transition from STATE 3 to STATE 0 based on whether a torque request returned to a lower torque value and the pedal is a closed position before a transition through the lash zone is completed, or the transmission is in neutral or disabled. Any of these conditions will thus cause the routine to transition to STATE 0.

Block 538 shows STATE 4, in which control logic ramps in torque increases after completing a transition through the lash zone. Specifically, the limits on spark timing and throttle (if any) are ramped out to make the torque output available to provide the desired driver response. This can be done rapidly or more smoothly, depending on operating conditions, for example. As indicated in the parenthesis, from block 538, the control may transition to STATE 0.

540 shows the only transition from STATE 4, specifically, a transition from STATE 4 to STATE 0. The transition of 540 may be triggered when the ramping of throttle and spark timing is completed (e.g., when ignition timing retard has ramped out), or when a timer for being in STATE 4 has exceeded a threshold.

As previously noted above, the transition diagram of FIG. 5 illustrates an example routine that may be used to control operation through the lash zone to both reduce clunk while still providing a rapid driver response. Further, in this example, both slip based and non-slip based conditions may be used to achieve robust operation over a variety of operation conditions, such as either a locked or unlocked torque converter, manual transmissions, etc.

Further, in one or more of the above states (and in one embodiment in all states), the airflow control and/or the spark control can be subject to overrides based on driver input (pedal position, rate, or some combination) so that as the driver demand increases the system responsiveness can also increase. Further, in one, some, or all states, the torque, airflow and spark limiting can be subject to overrides based on commanded transmission downshifts and downshifts that are 'in progress' (ratio is changing) to bring engine torque up quickly to enable the transmission to make a smooth and responsive shift. For example, torque, airflow and spark limiting can be subject to overrides in all states if a downshift commanded based on driver demand is detected. Finally, transitions between modes, or the timing or use of some limiting states are responsive to driver demand downshifts in progress (transmission ratio starting to change).

Figure 6:
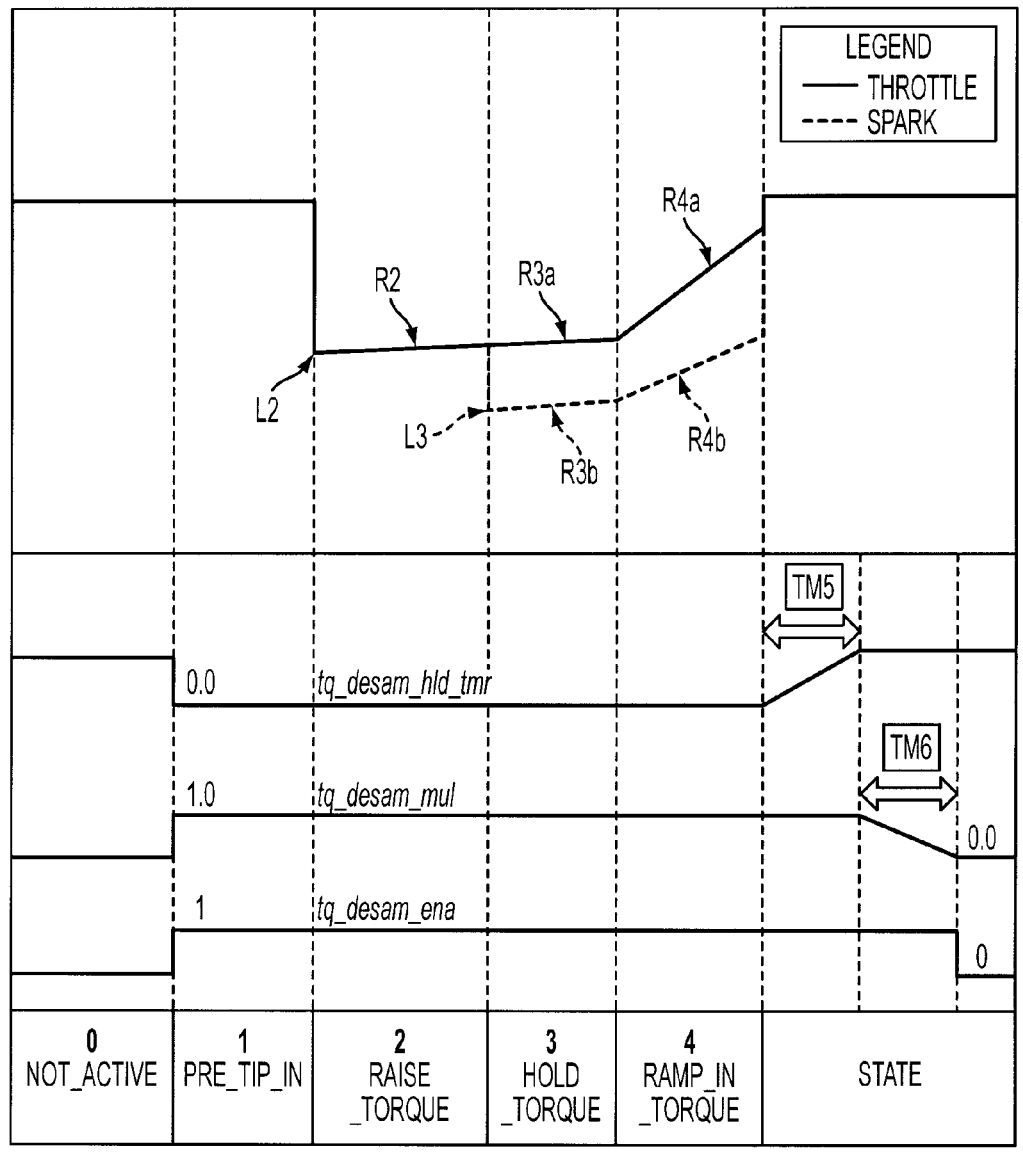
FIG. 6 is a timing diagram showing example operation according to FIG. 5.

Referring now to FIG. 6, it shows a timing diagram corresponding to the operation of FIG. 5. Specifically, it shows the response to a driver tip-in during various STATES, or modes, and illustrates adjustments to both throttle position and ignition timing. In the graph, the following labels are used: L2 is the initial mode 2 torque command level for throttle and spark, L3 is the initial mode 3 torque command level for spark, R2 is the rate of increase in the throttle and spark torque commands during mode 2, R3*a* is the rate of increase in the throttle command during mode 3 (note that the throttle command does not step down like the spark command, R3*b* is the rate of increase for spark in mode 3, and R4*a* and R4 *b* are similar to R3*a* and R3*b*. The graph also illustrates the airflow holding timer (tq_desem_hld_tmr) which counts up during time TM5, and the torque multiplier (tq_desam_mul) which counts down during time TM6. Finally, it shows the enable flag (tq_desem_ena) indicating that the above control logic is active.

Figure 7:
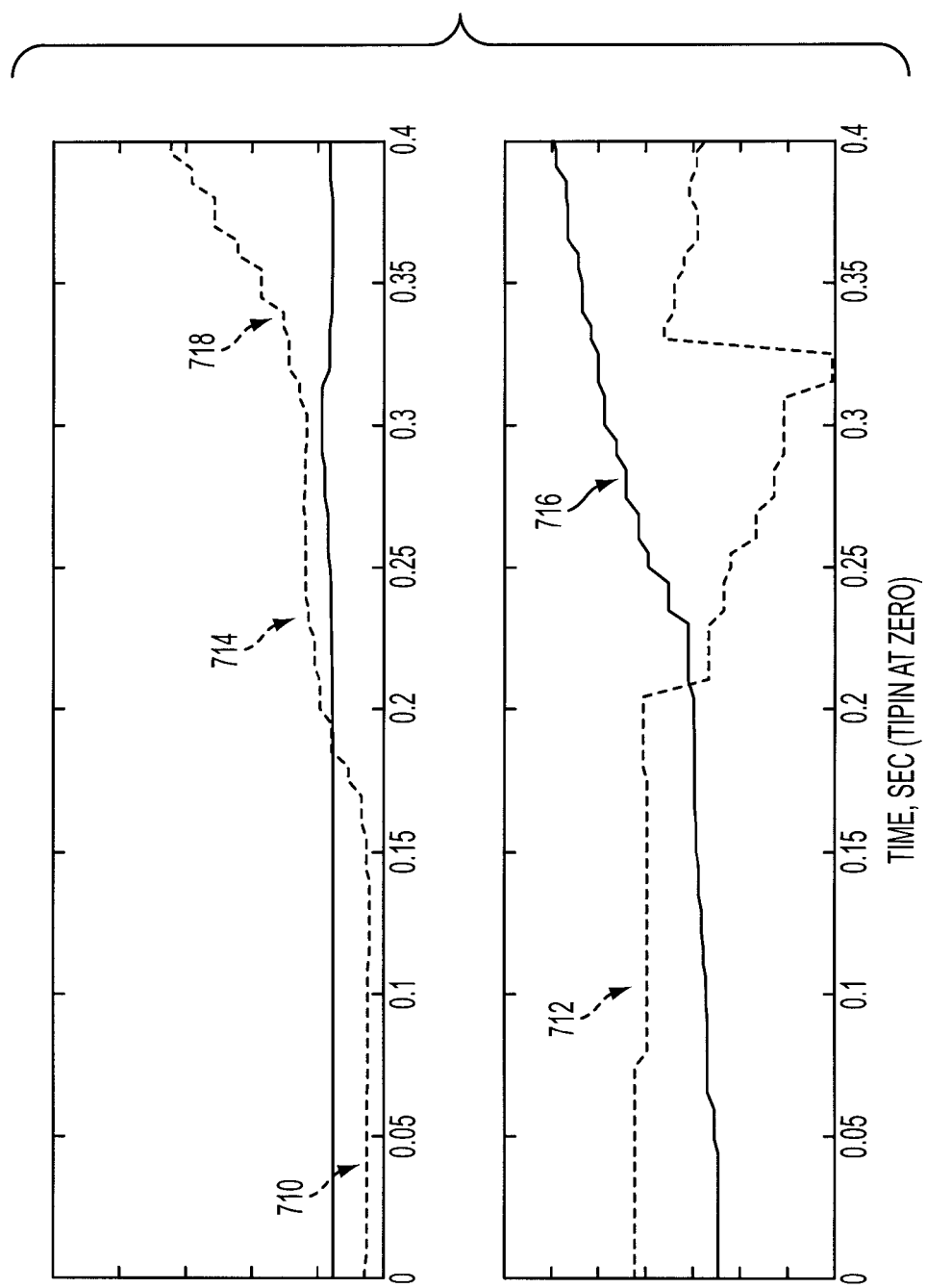
FIG. 7 is a graph illustrating additional example operation.

Referring now to FIG. 7, another example of system operation is illustrated in which coordinated throttle and spark adjustments are provided to manage driveline lash transition. Specifically, the plot shows the coordinated way that engine airflow is used to accelerate the engine up to turbine speed at maximum spark, then spark is retarded to slow engine acceleration through the driveline lash zone and then torque is again increased rapidly via spark and airflow after lash has been crossed.

The top graph of FIG. 7 shows turbine speed (torque converter output speed) in solid, and engine speed (torque converter input speed) in dashed. Further, the bottom graph shows engine airflow in solid and absolute spark advance in dashed. The x-axis of both graphs shows time in seconds. While this example is based on vehicle data, it represents only one example transition, and as noted herein, various alternatives are possible.

During the initial vehicle operation (around 710), the fuel injectors are cut-out (e.g., deactivated). While in this particular example the system incorporates injector cut-out during deceleration or driver tip-out conditions, injector cut-out may also be eliminated. Further, during the initial operation, the torque converter slip (turbine speed-engine speed) is controlled to approximately −50 rpm, e.g., via a lock-up clutch, number of cylinders active, etc. Then, around 712, engine airflow is increased, injectors are activated, and the spark angle is maintained at approximately mbt, in response to a driver tip-in. Then, around 714, a small slip across the torque converter is maintained until the lash zone is crossed via airflow and spark retard control. Around 716, airflow is further increased for good torque response, with spark retarded as need to hold engine speed through the lash zone and then increase torque quickly. Finally, around 718, the transmission control (e.g., clutch duty cycle) allows the converter to slip as engine torque is increased.

As will be appreciated by one of ordinary skill in the art, the specific routines and block diagrams described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

It will be appreciated that the configurations and embodiments disclosed herein are exemplary in nature, and that these specific embodiments are not to be considered in a limiting sense, because numerous variations are possible. For example, the above valve can be applied in a variety of areas, including various types of engines, such as V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle control method for a vehicle, comprising:
   operating an internal combustion engine coupled to a torque converter, the torque converter having an input speed and an output speed, the torque converter coupled to a transmission, the transmission coupled to wheels on a road;
   via a processor of the vehicle, in response to a pedal tip-in sense from a pedal position sensor, and during a transition from output speed greater than input speed to output speed less than input speed, continuing to increase engine airflow while retarding spark timing to limit torque increases; and then
   advancing spark timing in response to the transition from output speed greater than input speed to output speed less than input speed.

2. The method of claim 1 wherein adjustment of said airflow and spark timing are coordinated during said transition and wherein airflow is adjusted to rapidly accelerate engine speed up to torque converter output speed while retarding and then advancing spark timing to achieve a desired engine torque level once positive torque transmission is achieved.

3. The method of claim 2 wherein airflow and spark timing are coordinated so that airflow increases rapidly during said transition and spark timing retard limits a rate of engine torque increase to reduce a gear lash effect.

4. The method of claim 1, wherein engine airflow and spark timing are further adjusted in response to an overriding driver input via a pedal position or rate of pedal actuation.

5. The method of claim 1, wherein engine airflow and spark timing are further adjusted in response to an overriding input from a transmission responsive to a transmission shift.

\* \* \* \* \*